United States Patent [19]

Dale

[11] 4,454,680
[45] Jun. 19, 1984

[54] ROPE WICK CHEMICAL RECOVERY APPARATUS

[75] Inventor: Jim E. Dale, Greenville, Miss.

[73] Assignee: The United States of America as represented by the Secretary of Agriculture, Washington, D.C.

[21] Appl. No.: 378,317

[22] Filed: May 14, 1982

[51] Int. Cl.$^3$ ............................................. A01C 15/00
[52] U.S. Cl. ..................................................... 47/1.5
[58] Field of Search .................... 47/1.5, 1.7; 119/156, 119/157

[56] References Cited
U.S. PATENT DOCUMENTS

| | | | |
|---|---|---|---|
| 2,912,961 | 11/1959 | Stark | 119/156 |
| 3,584,787 | 5/1971 | Thomason | 47/1.7 |
| 4,255,922 | 3/1981 | Hiyama et al. | 47/1.7 |
| 4,377,920 | 3/1983 | Bowman | 47/1.5 |

Primary Examiner—Robert E. Bagwill
Assistant Examiner—Bradley M. Lewis
Attorney, Agent, or Firm—M. Howard Silverstein; David G. McConnell; Raymond C. Von Bodungen

[57] ABSTRACT

A new apparatus for the application of liquid chemicals to plants is disclosed. Plants are treated by selectively contacting a wick saturated with chemical solution. As the chemical is deposited on plants, the solution in the wick is replenished by gravitational flow and capillary action from a reservoir at the upper end of the diagonally-positioned wick. Excess chemical not applied to plants is dripped from the lower end of the wick into a collection reservoir from where it can be recovered and recycled for reuse. Adequate mounting and support is provided for all the salient parts to allow for positioning and portability.

5 Claims, 4 Drawing Figures

ROPE WICK CHEMICAL RECOVERY APPARATUS

BACKGROUND OF THE INVENTION

1. Field of the Invention

This invention relates to the application of liquid chemicals to plants. More specifically, this invention relates to a new apparatus for applying liquid chemical solution using the energy of gravitational flow and capillary action and recovering excess chemical dispensed by wick applicators.

2. Description of the Prior Art

Heretofore, systemic agricultural chemicals were applied to plants by wiping the tops of plants with chemical-ladened rope wicks. Various systems are employed, but all are dependent on maintaining the required saturation of wick during long periods of time while treating fields that contain plants varying in size and number. All too frequently, the wicks are either too dry to apply the prescribed dosage when it is needed or so wet that excess agricultural chemical drips from the wicks onto soil and non-targeted desirable plants resulting in waste of valuable chemical, pollution of the environment, and injury of crop plants.

SUMMARY OF THE INVENTION

The instant invention eliminates handicaps caused by variation in plant populations because the chemical which is not applied to targeted plants is collected and recovered for recycling rather than disadvantageously spilling into the environment. Thus the apparatus recovers and recycles unused liquid agricultural chemicals dispensed from a rope wick applicator which is used to contact control chemicals with plants and foliage. The apparatus comprises the following combination. There is a first reservoir which contains agricultural chemicals and acts as a storage means. A rope wick is diagonally positioned below the reservoir in the form of a loop. This is accomplished by affixing two ends of the rope wick through the bo-tom of the first reservoir to form a descending loop and affixing the center/middle of the wick to a support member. The ends of the wick are thus immersed in agricultural chemical inside the reservoir and the wick picks up and transports agricultural chemical by means of capillary action and flows throughout the wick by gravity, thus saturating the wick. Therefore, the center/middle of the wick is supported below and to the side of the reservoir in order to properly set the angle of diagonal of the wick. A second reservoir is provided just below the point of the supported center/middle of the wick. Since the top of the second reservoir is opened any excess agricultural chemical which drips from the wick is caught by the second reservoir. Supporting means is provided for the first reservoir, second reservoir, and middle rope wick support in a manner of holding each with respect to each other.

PREFERRED EMBODIMENTS OF THE INVENTION

The materials used for construction of the instant invention must be compatible with the agricultural chemicals to be dispensed. It may be metal, plastic, rubber, etc., but compatibility with the agricultural chemical used in mandatory. Size and shape is usually dictated by the means to which the apparatus is to be used. However, it must be of sufficient size and shape to endure movement over uneven or rough terrain and not have to be subjected to frequent filling or maintenance. It is to be understood that the entire apparatus is moved by any conventional means of power source, such as a tractor, etc., across a field at a predetermined ground speed selected to depend on conditions and plants or foilage to be treated. Environmental conditions and field conditions will be contributing factors as well as the type of foliage or plants to be treated. The above applies to all of the individual elements of the instant invention as well as the apparatus as a whole.

Figure 1:
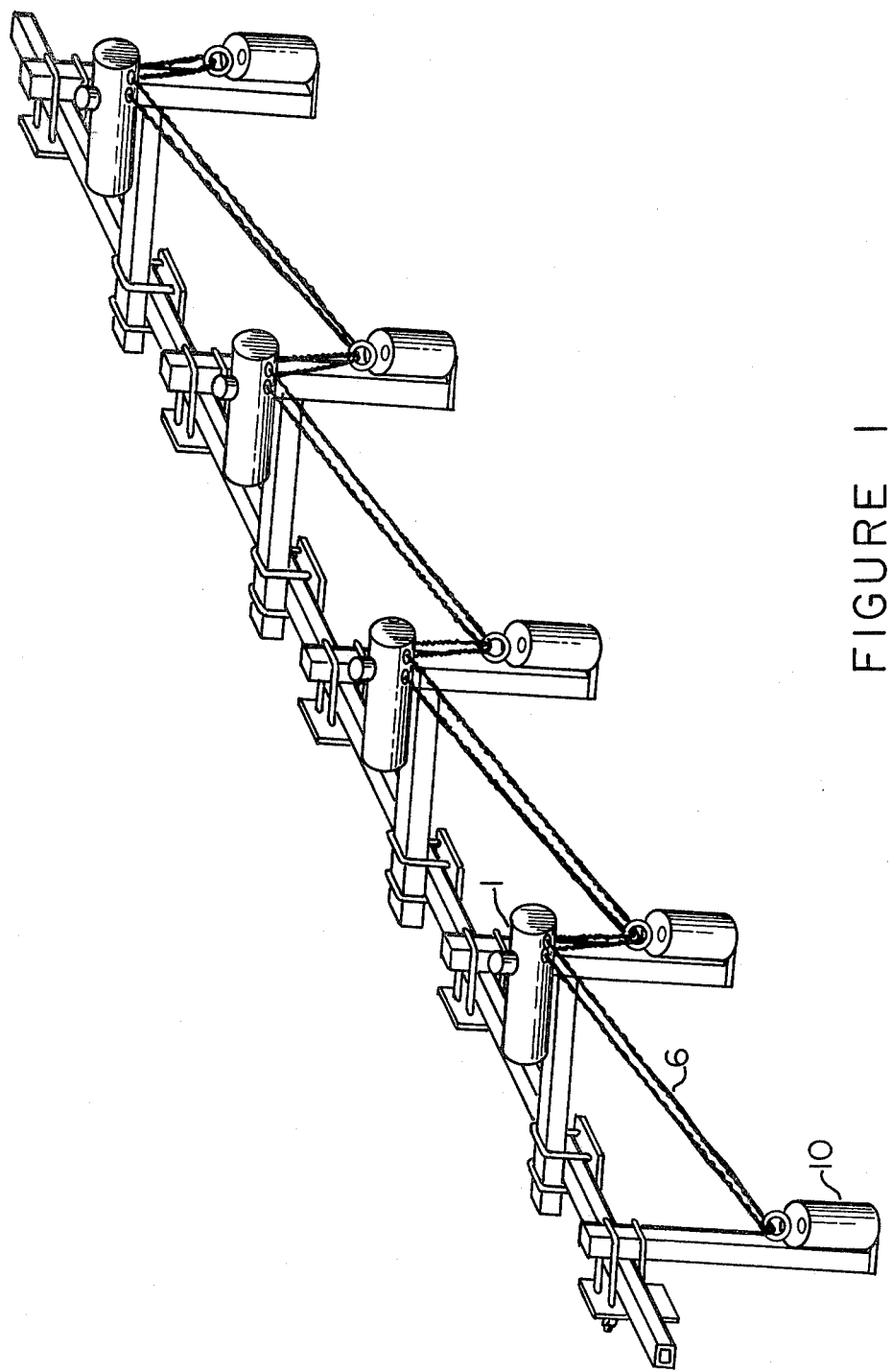
FIG. 1 is an isometric view of a plurality of assembled rope wick chemical apparatuses.
Figure 2:
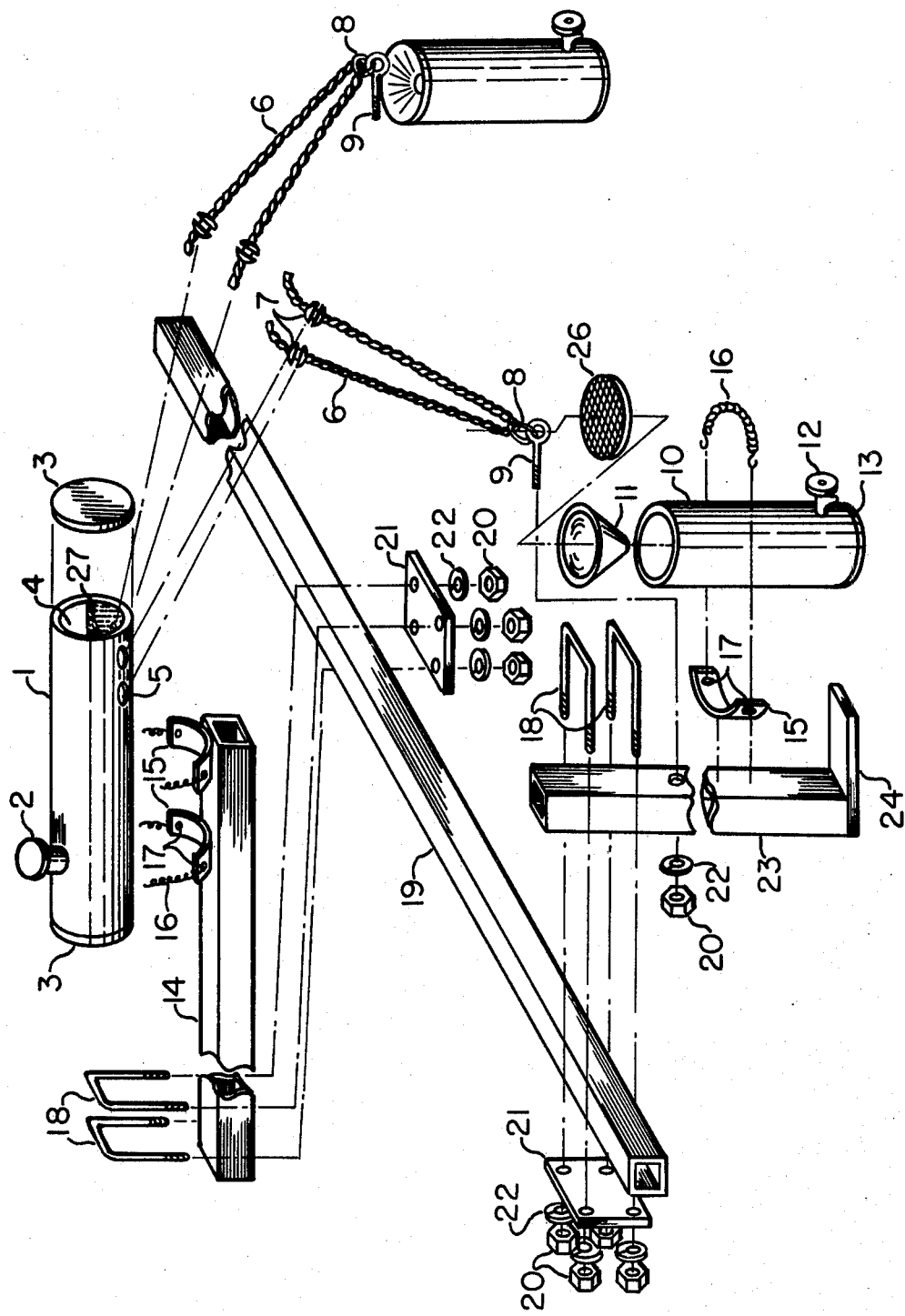
FIG. 2 is a side exploded view showing the component parts in relation to each other as typically assembled for application of agricultural chemical to plants in one crop row.

Referring now to FIGS. 1 and 2, wherein a plurality of apparatuses are shown; tool bar 19 is attached to any convenient power source (not shown). Liquid agricultural chemical is placed in liquid first reservoir 1 by removing vented fill cap 2 and pouring the chemical into first reservoir 1. First reservoir 1 can be of any size, shape, or material and is determined by the use to which it is subjected. End plates 3 are attached to the body of first reservoir 1 by any convenient compatible means, i.e. glueing, welding, cut threads, etc. However, the means of attaching end plates 3 must preclude leaking of the agricultural chemical liquid where the edges are joined.

Figure 3:
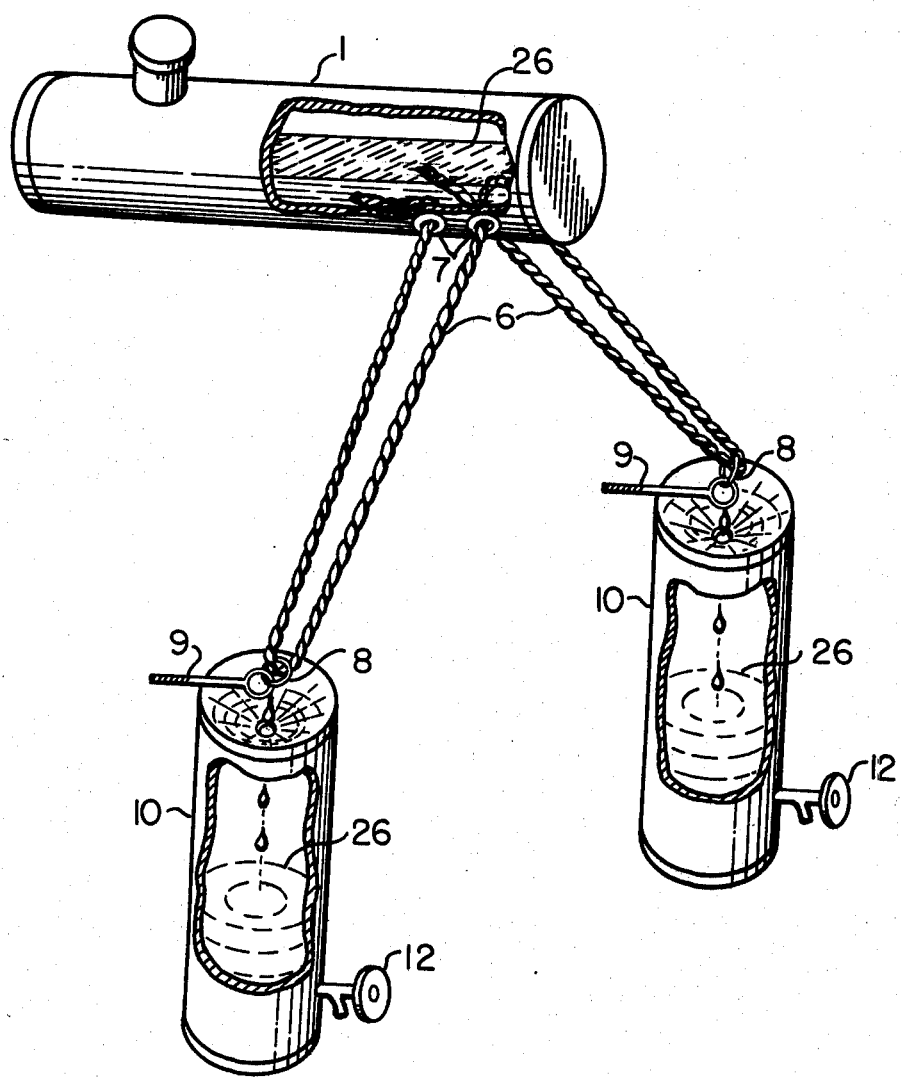
FIG. 3 is a detailed isometric of the wick and reservoir system.
Figure 4:
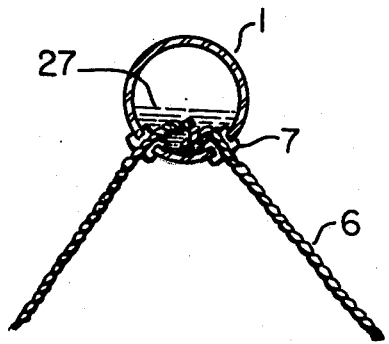
FIG. 4 is a detailed view showing how the wick is assembled into the first reservoir.

Agricultural chemical inside storage space 4 of reservoir 1 is dispensed through openings 5 by means of wick 6 (see FIGS. 3 and 4) which is fitted through openings 5 and sealed with bushing 7 in the bottom of first reservoir 1. Bushing 7 may also be a compression fitting depending on need. In the instant invention, a bushing was used since it was not necessary to change the wicks out but wick 6 was stationary. Bushing 7 is attached in opening 5 by any convenient means, and again leakage problems must be compensated for. Wick 6 must be capable of rapid replenishment of agricultural liquid chemical by movement under force of gravity and capillary action from first reservoir 1, yet unused agricultural chemical must be retained in and on wick 6 with minimal dripping. In the instant invention ½ inch diameter diamond-braided rope with a polyester jacket and acrylic fiber core manufactured by Gulf Rope and Cordage Co., Inc., Mobile, Ala., was used for wick 6. Wick 6 is positioned as a loop and held in place at its center/middle by elastic band 8 and eye bolt 9 so that the lowest part of the center/middle of wick 6 is secured over second reservoir or catch basin 10. The inside opening of funnel cap 11 which fits inside the tip of second reservoir/catch basin 10, and eye bolt 9 is attached to vertical support member 23. A wire spring can be used instead of an eyebolt if a flexible design is desired instead of rigidity. The ends of wick 6 are affixed through the bottom of first reservoir 1 and immersed in agricultural chemical solution. Chemical flows through wick 6 by capillary action and gravitational means. Thus wick 6 is saturated with chemical solution. Wick 6 is diagonally positioned as a descending loop of predetermined length necessary to contact the foliage and plants to be treated. Excess agricultural liquid chemical moved by gravity and capillary action through wick 6 and not wiped on plants is collected in second reservoir/catch basin 10 to avoid dripping or getting into the environment. Agricultural liquid chemical collected in second reservoir catch basin 10 can be removed by opening drain spigot 12 mounted near the bottom of second reservoir/catch basin 10. If desired a pumping arrangement can be provided to recycle agricultural chemical liquid between second reservoir/catch basin 10 and reservoir 1 on a continuous basis (not shown). Funnel cap 11 and base cap 13 of catch basin 10 are attached by any convenient means. Elastic band 8 and eye bolt 9, must be secured to vertical support 23 to adequately anchor wick 6 in position so that agricultural chemical dripping from the end of wick 6 falls through the opening of funnel cap 11 where it collects in basin 10. Elastic band 8 is provided for additional flexibility where needed. Filter 26 must be provided over funnel 11 to prevent trash from entering basin 10.

Fluid reservoir 1 (FIGS. 1 and 2) is attached to a horizontal support 14 and secured in position in cradle straps 15 by wire spring 16 inserted in holes 17 at each end of cradle strap 15. Cradle straps 15 are attached to horizontal support 14 by welding or any other convenient means. Horizontal support 14 is attached to tool bar 19 with U-bolts 18 and secured in position by bolt plate 21, lock washers 22, and nuts 20.

Catch basin 10 is attached to vertical support 23 in a resting position on bottom support 24 and secured by cradle strap 15 and wire spring 16. The ends of wire spring 16 are inserted through holes 17 which are drilled in the ends of cradle strap 15. Vertical supports 23 are attached to tool bar 19 by means of U-bolts 18 which are secured in position by bolt plate 21, lock washers 22, and nuts 20, (FIG. 2).

This embodiment as described is for a typical application to control tall weeds growing in a crop row of shorter plants, and would be attached to a tractor. Tool bar 19 could be attached in front or behind the tractor and positioned and adjusted horizontally as desired. Clamps securing horizontal supports 14 to tool bar 19 would be loosened to position fluid reservoirs 1 directly above crop rows thus providing height, angle adjustment, and row spacing to chemical reservoir 1. Reservoir 1 is vertically positioned above catch basin 10 of sufficient height to allow efficient capillary and gravitational flow of the agricultural chemical between reservoir 1 and catch basin 10. Furthermore, wick 6 must be diagonally positioned between reservoir 1 and catch basin 10 not only for efficient chemical flow but to give adequate and optimum contact with the weeds to be treated. This optimum distance is determined by the parameters of row spacing, tractor speed, viscosity of the chemical type of terrain, size of crop and weed plants. Therefore, the diagonal angle of wick 6 is between 30° and 45° off the horizontal for efficient chemical flow, and to meet the above mentioned parameters. The length of wick 6 will be determined by center to center of row spacing and be of sufficient length to achieve the above required angle.

Vertical supports 23 can be positioned so that catch basins 10 are centered in the middle of the space between crop rows. Each row treated would require a fluid reservoir 1 with catch basins 10 on each side of the row. In a typical application of a herbicide four rows of crop would be treated per trip across the field. The treatment would require four fluid reservoirs 1 (as shown in FIG. 1) above the four rows and five catch basins 10 in the spaces between rows.

The divergence of the angle between pairs of wicks 6 descending downward between crop rows from each fluid reservoir 1 to catch basins 10 would be adjusted by moving horizontal supports 14 and vertical supports 23 in relation to tool bar 19 and with respect to one another to increase or decrease the angle. Selection of the angle of divergence of wick would be dependent on the height and width of crop plants and weeds, and the speed of movement across the field. But the minimum angle of slope of wicks 6 from fluid reservoir 1 to catch basins 10 must be such that agricultural chemical not applied to weeds moves across wick 6 to catch basin 10 to minimize dripping. This has been found emperically to be about 30°. The maximum angle of slope will be determined by the width of crop canopy and has been determined emperically to be about 45°. As an example, the instant invention observed the following demensional criteria: Reservoir 1 was approximately a two gallon capacity. Catch basin 10 was approximately one gallon. Tool bar 19 was approximately 15–16 feel long. Horizontal supports 14 were approximately 2–3 feet long. Vertical support 23 was approximately 3–4 feet long. Wick 6 was $\frac{1}{2}''$ diameter and approximately 7 feet long. The instant invention is not to be construed as limited by the above criteria but as stated before is set by criteria of operation. However, the above parameters were used to test the instant invention in an agricultural environment during an eight hour cultivating period and found to be adequate. The length of time required for catch basins 10 to become filled with the unused chemical solution recovered from the lower ends of wicks 6 would be dependent on the number of encounters between wick 6 and weeds and the amount of chemical solution used to treat the weeds. In the typical operation the wicks are saturated and ready for use in 15 minutes. If no chemical at all were being removed from the wicks by contact with weeds, the catch basins in the instant embodiment would require emptying after 8 hours of continuous operation using the herbicide, glyphosphate, at a concentration of 1 part herbicide to 3 parts water. For glyphosate solutions in other proportions, and for other agricultural chemicals, the required frequency for removal of the recovered chemical would be different.

I claim:

1. An apparatus for recovery and recycling of unused liquid agricultural chemicals dispensed from a rope wick applicator which is brought into contact with foliage and plants, said apparatus comprising in combination:

(a) a first reservoir containing agricultural chemical for storage;

(b) a diagonally positioned rope wick, said rope wick forming a decending loop of predetermined length necessary to contact the foliage and plants to be treated, said rope having two free ends affixed through the bottom of the first reservoir and the center/middle affixed to a support member, said ends immersed into said chemical solution, thereby enabling the wick to transport chemical solution by means of capillary action and gravity through the wick, thereby saturating the wick with chemical solution, said support member positioned below and to the side at an angle of 30° to 45° of said first reservoir, thereby setting the angle of diagonal on the wick;

(c) a second reservoir located below the affixed center/middle of the rope wick, said second reservoir with an opened top to catch and store the unused agricultural chemical solution which drips from the center/middle point of said rope wick;

(d) means for mounting and supporting said first reservoir, second reservoir, and said support member with respect to each other.

2. The apparatus of claim 1 including a funnel means in the top of said second reservoir to assist catching and directing the unused chemical drip.

3. The apparatus of claim 2 including a screen over the top of said funnel means to exclude trash and foreign matter from the second reservoir.

4. The apparatus of claim 3 wherein said flexible expansion means for affixing the rope wick loop to the support member of 1(b) is an elastic member.

5. The apparatus of claim 4 including a means of sealing the rope wick at the point it is affixed through the bottom if the first reservoir.

* * * * *